Feb. 10, 1925.
G. H. GRAY
1,525,731
DEVICE FOR LOCKING MOVABLE LEVERS
Filed March 16, 1922
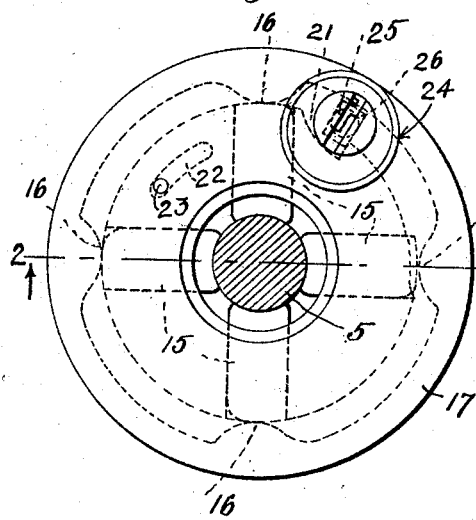
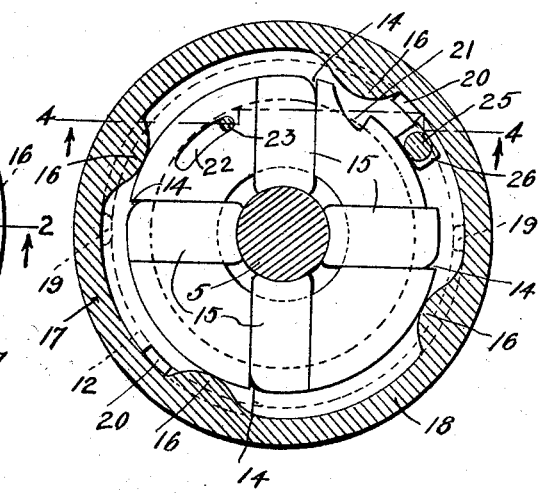
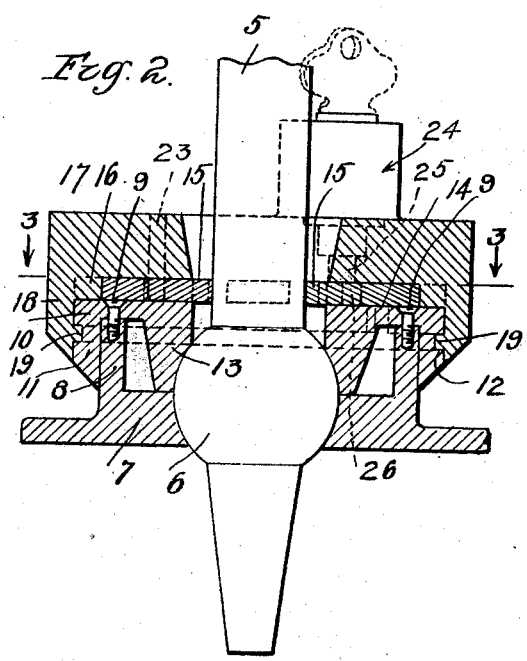
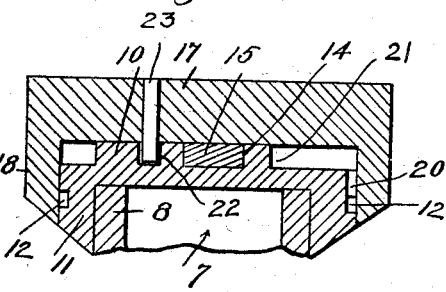
Inventor
Granville H. Gray
by
Atty.

Patented Feb. 10, 1925.

1,525,731

UNITED STATES PATENT OFFICE.

GRANVILLE H. GRAY, OF SANTA ANA, CALIFORNIA.

DEVICE FOR LOCKING MOVABLE LEVERS.

Application filed March 16, 1922. Serial No. 544,292.

*To all whom it may concern:*

Be it known that I, GRANVILLE H. GRAY, a citizen of the United States, residing at Santa Ana, in the county of Orange and State of California, have invented new and useful Improvements in Devices for Locking Movable Levers, of which the following is a specification.

The present invention relates to locking devices for vehicles and is more particularly adapted for use in connection with the gear shifting levers of motor vehicles to enable the lever to be locked in neutral position, thereby preventing the movement of the vehicle under its own power, and at the same time enabling the vehicle to be moved by power applied from without, as for example, when it is desired to move the vehicle from place to place in a garage or other storage building.

With the above mentioned and other objects in view, the invention consists in the novel construction and combination of parts which will be hereinafter more fully described and which will be illustrated in the accompanying drawings, in which:

Fig. 1 represents a plan view of my locking device shown as applied to a gear shifting lever in locked position.

Fig. 2 is a vertical section of the same taken on the line 2—2 of Fig. 1 viewed in the direction indicated by the arrows.

Fig. 3 is a transverse section taken on the line 3—3 of Fig. 2 showing the position of the locking mechanism when the lever is unlocked.

Fig. 4 is a section taken on the line 4—4 of Fig. 3, viewed in the diretion indicated by the arrows.

In carrying out my invention 5 represents a shifting lever employed in connection with the transverse gear system of a motor vehicle. The lever 5 is provided at its fulcrum point with a ball 6 adapted to engage in a socket formed in a standard member 7, adapted to be secured to the floor of the vehicle or to the gear case, through which the lower end of the lever extends, said end being adapted to engage in the usual manner with the transmission gears (not shown).

The standard member 7 is provided with an upstanding annular flange 8 to which is secured by means of the screws 9 a top member 10. The top member 10 is provided with a downwardly projecting flange 11 adapted to surround the flange 8, the external surface of which is provided with an annular groove 12, and a downwardly projecting centrally disposed boss 13 provided with a socket adapted to engage with the upper part of the ball 6.

The upper surface of the top member 10 is provided with a plurality of radially disposed grooves 14 for the reception of the lever centering members 15, the inwardly projecting ends of which being adapted to engage with the lever 5 and the outwardly projecting ends being adapted for engagement with the cam members 16 formed integral with a cap member 17 which is adapted to rest above the centering members 15, and for revolution, to actuate said centering members.

The cap 17 is provided with a downwardly projecting flange 18 adapted to surround the flange 11, said flange 18 being provided with inwardly projecting lugs 19 adapted to engage in the groove 12, thus permitting of rotary movement of the cap, but preventing the same from being lifted from the standard 7 and top member 10.

In order that the cap 17 may be conveniently assembled to the top member 10, said top member is provided with the vertically disposed notches 20 which communicate with the groove 12. By this construction it will be obvious that the lugs 19 may be registered with the notches 20, and inserted therein, thus permitting the cap 17 to be adjusted on the top member 10, and when given a turn to be locked thereto.

The peripheral edge of the top member 10 is provided with a notch 21 for the reception of a key operated bolt, and the upper surface thereof is provided with a segmental groove 22, for the reception of a pin 23 secured in the cap member 17.

Mounted in the cap member 17 is a key operated lock 24 provided with the downwardly projecting key actuated shaft 25 upon the end of which is secured the bolt 26 adapted to engage in the notch 21 of top member 10.

By the above recited construction it will be obvious that when the cap member 17 is adjusted on to the standard 8 and the pin 23 driven into position, said cap member may be revolved for a limited part of a revolution in either direction, but not far enough to enable the lugs 19 to be removed through the notches 20, thus the cap member will become permanently locked from vertical movement with respect to the standard.

As illustrated in Figs. 1 and 2 of the drawings, the lever 5 is shown as locked in a neutral position, the centering members 15 being interposed between the lever and the cams 16 and the bolt 26 engaging in the notch 21 to prevent the cams from being turned in one direction and the pin 23 engaging with one end of the groove 22 to prevent the turning of the cams in the opposite direction.

When it is desired to unlock the lever 5 in order that it may be manipulated to perform its usual functions, the key is inserted into the lock 24 and the bolt 26 turned thereby for about a quarter turn, thus disengaging the bolt 26 from the notch. After the bolt 26 has been disengaged from the notch 21 it will be obvious that the cap 17 may be turned to the right, thus moving the cams 16 from engagement with the centering members 15, as clearly shown in Fig. 3 of the drawings.

After the above recited operation it will be evident that the lever may be shifted in any direction to perform its function, and while being so shifted the centering members 15 will be moved outwardly, the cam shaped locking lugs 16 at this time being out of their path.

By the above described construction, it will be obvious that I have provided a very simple and efficient mechanism for the locking of the lever, which is completely housed in, in order that it may not be tampered with by any one other than the person possessing the key.

What I claim is:—

1. In a locking device for levers, the combination with a movable lever, a standard adapted to surround said lever, a plurality of radially disposed lever centering members movably mounted on said standard, and a key controlled cam mechanism rotatably mounted on said standard adapted to lock said lever centering members from movement.

2. In a locking device for levers, the combination with a lever, a standard adapted to surround said lever, a plurality of centering members mounted on said standard, a rotatable cap member provided with a plurality of cams adapted to engage with said centering members mounted on said standard, and means for locking said rotatable cap member to said standard.

3. In a locking device for levers, the combination with a lever, a standard adapted to surround said lever and provided with a notch, a plurality of centering members slidably mounted in said standard, a cap member adapted to rotate on said standard provided with a plurality of cams for engagement with said centering members, and a key actuated bolt mounted on said cap member adapted to engage with the notch in said standard.

4. In a locking device for levers, the combination with a lever, a standard adapted to surround said lever, a cap member secured to said standard for rotary movement thereon, a plurality of lever centering members interposed between said standard and cap, means for adjusting said centering members, and means for locking said centering members in an adjusted position.

5. In a locking device for levers, the combination with a lever, a standard adapted to surround said lever provided with an annular groove on its outer surface and a segmental groove in its upper surface, a cap member mounted for rotation on said standard provided with a lug adapted to engage with the annular groove in the standard, said cap member being provided with a pin adapted to engage in the segmental groove in the standard, a plurality of radially disposed centering members mounted for sliding movement between said standard and cap member, a plurality of cam members secured to said cap member adapted to engage with said centering members, and a key actuated bolt mounted in said cap member adapted to engage with the notch in the upper end of said standard.

In witness that I claim the foregoing I have hereunto subscribed my name this 27th day of February, 1922.

GRANVILLE H. GRAY.